United States Patent
Chan et al.

(10) Patent No.: US 9,858,498 B2
(45) Date of Patent: Jan. 2, 2018

(54) SYSTEMS AND METHODS FOR INCREMENTAL OBJECT DETECTION USING DUAL-THRESHOLD LOCAL BINARY PATTERN OPERATORS

(71) Applicant: QUALCOMM Incorporated, San Diego, CA (US)

(72) Inventors: Victor Chan, Del Mar, CA (US); Alok Govil, Fremont, CA (US); Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/863,364

(22) Filed: Sep. 23, 2015

(65) Prior Publication Data
US 2017/0083788 A1 Mar. 23, 2017

(51) Int. Cl.
  *G06K 9/46* (2006.01)
  *G06K 9/66* (2006.01)
  *G06K 9/62* (2006.01)

(52) U.S. Cl.
  CPC ............. *G06K 9/6201* (2013.01); *G06K 9/46* (2013.01); *G06K 9/6267* (2013.01); *G06K 2009/4666* (2013.01)

(58) Field of Classification Search
  CPC ....... G06K 2009/4666; G06K 9/00221; G06K 9/6267; G06K 9/6201; G06K 9/46
  See application file for complete search history.

(56) References Cited

U.S. PATENT DOCUMENTS

2010/0272363 A1* 10/2010 Steinberg ........... G06K 9/00228
  382/190
2011/0116682 A1* 5/2011 Wang ................. G06K 9/00771
  382/103
(Continued)

FOREIGN PATENT DOCUMENTS

CN  102332086 A  1/2012
CN  103281477 A  9/2013
(Continued)

OTHER PUBLICATIONS

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.
(Continued)

*Primary Examiner* — Samir Ahmed
(74) *Attorney, Agent, or Firm* — Kilpatrick Townsend & Stockton, LLP

(57) ABSTRACT

Methods, systems, computer-readable media, and apparatuses for incremental object detection using a staged process and a band-pass feature extractor are presented. At each stage of the staged process, a different band of features from a plurality of bands of features in image data can be extracted using a dual-threshold local binary pattern operator, and compared with features of a target object within the band for a partial decision. The staged process exits if a rejection decision is made at any stage of the staged process. If no rejection decision is made in each stage of the staged process, the target object is detected. Features extracted at each stage may be from a different image for some applications.

30 Claims, 13 Drawing Sheets

(56) References Cited

U.S. PATENT DOCUMENTS

| | | | |
|---|---|---|---|
| 2011/0268319 A1* | 11/2011 | Niskanen | G06K 9/4609 |
| | | | 382/103 |
| 2012/0027290 A1 | 2/2012 | Baheti et al. | |
| 2012/0219211 A1* | 8/2012 | Ding | G06K 9/4642 |
| | | | 382/159 |
| 2013/0163870 A1* | 6/2013 | Cao | G06K 9/4642 |
| | | | 382/170 |
| 2013/0223683 A1* | 8/2013 | Jiang | G06K 9/4638 |
| | | | 382/103 |
| 2014/0003663 A1 | 1/2014 | Li et al. | |
| 2014/0133742 A1* | 5/2014 | Xiao | G06K 9/00664 |
| | | | 382/159 |
| 2014/0270551 A1* | 9/2014 | Baranowski | G06K 9/6285 |
| | | | 382/226 |
| 2014/0314271 A1 | 10/2014 | Xu et al. | |
| 2015/0016679 A1 | 1/2015 | Cao et al. | |
| 2016/0094800 A1 | 3/2016 | Gousev | |
| 2017/0064211 A1 | 3/2017 | Omid-Zohoor | |

FOREIGN PATENT DOCUMENTS

| | | |
|---|---|---|
| DE | 102008052930 A1 | 4/2010 |
| KR | 20140073628 A | 6/2014 |
| WO | WO-2015054666 A1 | 4/2015 |

OTHER PUBLICATIONS

Heikkila, M., et al., "Description of Interest Regions with Center-Symmetric Local Binary Patterns", ICVGIP, 2006, pp. 58-69.

Tan, X., et al., "Enhanced Local Texture Feature Sets for Face Recognition Under Difficult Lighting Conditions", AMFG, 2007, pp. 168-182.

Tan, X., et al., "Enhanced Local Texture Feature Sets for Face Recognition Under Difficult Lighting Conditions", IEEE Transactions on Image Processing, 2010, vol. 19, Issue 6, pp. 1635-1650.

Zheng, Y., et al., "Effective Pedestrian Detection Using Center-symmetric Local Binary/Trinary Patterns", arXiv preprint arXiv:1009.0892, Sep. 2010, pp. 1-11.

International Search Report and Written Opinion—PCT/US2016/044860—ISA/EPO—Oct. 10, 2016.

* cited by examiner $LBP = 8b'00001111 = 1*1+1*2+1*4+1*8+0*16+0*32+0*64+0*128 = 15$

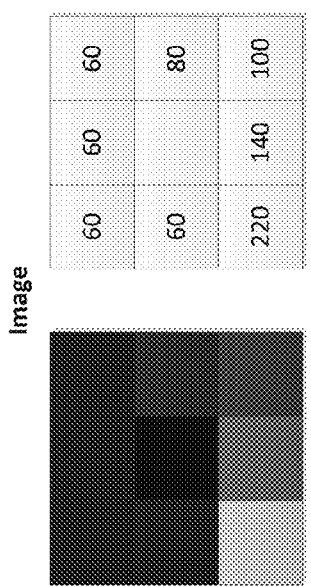
FIG. 8A
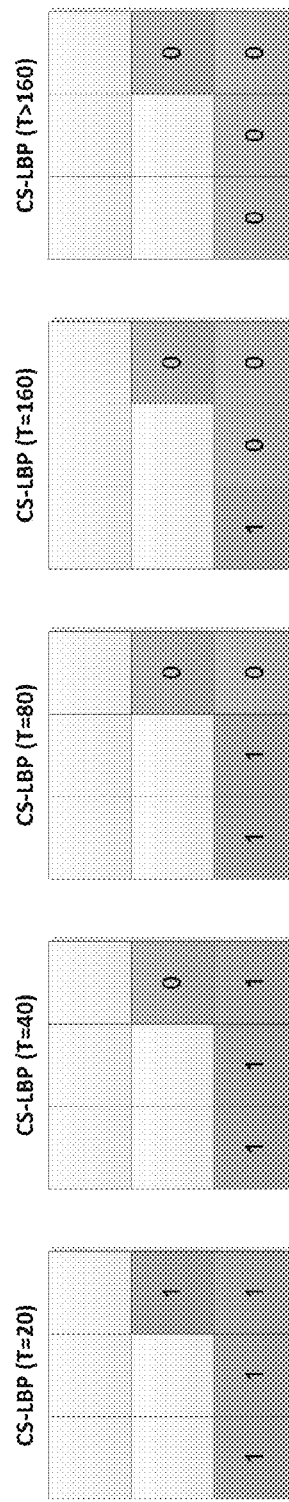
FIG. 8B
FIG. 8C
FIG. 8D
FIG. 8E
FIG. 8F

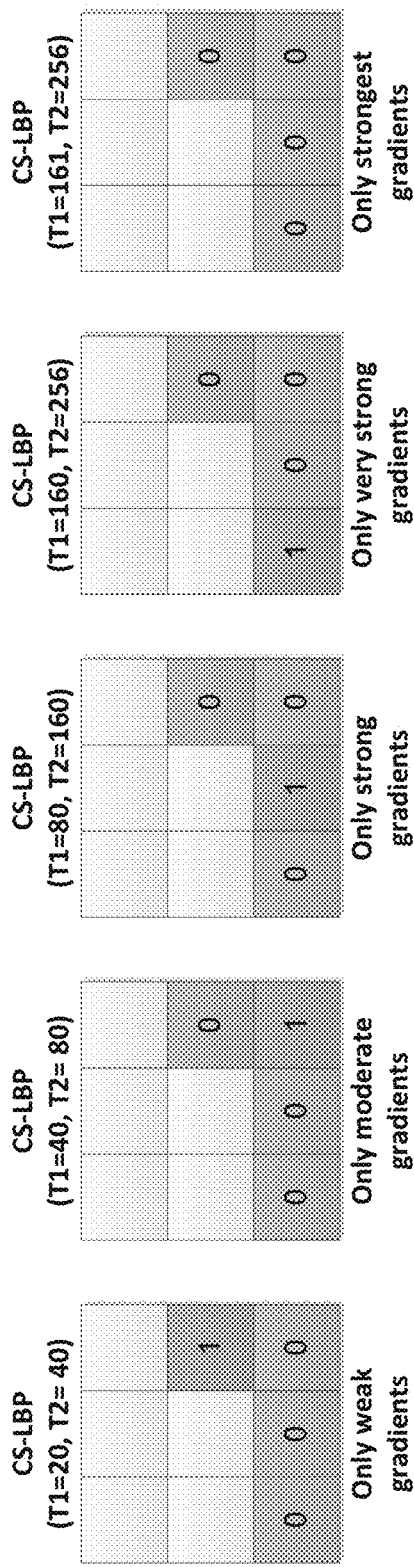

CS-LBP
(T1=20, T2=256)

All gradients

FIG. 10A

CS-LBP
(T1=40, T2=256)

All but weak gradients

FIG. 10B

CS-LBP
(T1=80, T2=256)

Strong and very strong gradients

FIG. 10C

CS-LBP
(T1=160, T2=256)

Very strong gradients

FIG. 10D

CS-LBP
(T1=161, T2=256)

Strongest gradients

FIG. 10E

SYSTEMS AND METHODS FOR INCREMENTAL OBJECT DETECTION USING DUAL-THRESHOLD LOCAL BINARY PATTERN OPERATORS

BACKGROUND

Computer vision involves acquiring, processing, analyzing, and understanding images for use in applications. Traditionally, a processor coupled to a sensor acquires image data from the sensor and performs certain computer vision operations on the acquired image data for detecting features and objects associated with the features. Features may include edges, corners, gradients, or textures. In some instances, features may also include more complex features, such as human faces, facial expressions and gestures. Programs executing on the processor may utilize the detected features in a variety of applications, such as plane detection, object classification, face detection, smile detection, and gesture detection.

Much effort has been made in recent years to enable computing devices to detect or classify features and objects in the field of view of a computing device. Computing devices, especially mobile devices, are generally very power-sensitive. However, traditionally, detecting features and objects in the field of view of the computing device using a camera requires significant processing resources, resulting in high power consumption and low battery life in computing devices, such as mobile devices. In always-on feature detection applications, capturing images continuously, storing the images, and extracting all features in an image before making a final decision based on all of the extracted features could consume a large amount of unnecessary power and significantly reduce the battery life of a computing device.

BRIEF SUMMARY

The disclosure generally relates to feature extraction and object detection using computer vision, and more specifically, improving efficiency for detecting features or objects using computer vision.

In some embodiments, a method of object detection is disclosed. The method includes (a) receiving or capturing one or more images; (b) performing object detection using the one or more images in a staged process, wherein each stage of the staged process includes: (i) selecting a different band of features from a plurality of bands of pre-determined features of a target object; (ii) extracting corresponding features within the band from the one or more images using a dual-threshold local binary pattern operator; (iii) determining whether a matching condition is met between the selected band of features from the plurality of bands of the pre-determined features of the target object and the corresponding features within the band extracted from the one or more images; and (iv) exiting the staged process and generating a signal indicating that the target object is not detected when the matching condition is not met; and (c) generating a signal indicating that the target object is detected if the matching condition is met at all stages of the staged process. In some embodiments, all corresponding features are extracted from one image. In some embodiments, the corresponding features extracted at each stage of the staged process are from a different image.

In some embodiments of the method of object detection, a dual-threshold local binary pattern operator, such as a center-symmetric local binary pattern operator, can be used.

In some embodiments, a threshold function of the dual-threshold local binary pattern operator is configured to return a first binary value if a difference between pixel values of two pixels in an image is between a lower threshold and an upper threshold, or return a second binary value if otherwise.

In some embodiments, extracting the corresponding features within the band from the one or more images includes setting the lower threshold and the upper threshold based on the selected band of features from the plurality of bands of the pre-determined features of the target object; and generating a local binary pattern label for a pixel in an image of the one or more images based on pixel values of neighboring pixels of the pixel in the image, the lower threshold, and the upper threshold.

In some embodiments of the method of object detection, the plurality of bands of the pre-determined features of the target object are determined using a classifier, such as a support vector machine, K-nearest neighbor, or clustering. In some embodiments, the plurality of bands of the pre-determined features of the target object are prioritized, and wherein selecting the band of features from the plurality of bands of the pre-determined features of the target object is based on the priorities of the plurality of bands of the pre-determined features of the target object.

In some embodiments, the method of object detection further comprises tracking a region of interest in the one or more images. In some embodiments, the target object is at least one of a physical object, a human face, a human facial expression, or a human gesture.

Also disclosed herein is an apparatus for object detection. The apparatus includes (a) means for receiving or capturing one or more images; (b) means for performing object detection using the one or more images at a plurality of stages in a staged process, wherein each stage of the plurality of stages includes: (i) means for selecting a different band of features from a plurality of bands of pre-determined features of a target object; (ii) means for extracting corresponding features within the band from the one or more images using a dual-threshold local binary pattern operator; (iii) means for determining whether a matching condition is met between the selected band of features from the plurality of bands of the pre-determined features of the target object and the corresponding features within the band extracted from the one or more images; and (iv) means for exiting the staged process and generating a signal indicating that the target object is not detected when the matching condition is not met; and (c) means for generating a signal indicating that the target object is detected if the matching condition is met at all stages of the plurality of stages. In some embodiments, all corresponding features are extracted from one image. In some embodiments, the corresponding features extracted at each stage of the plurality of stages are from a different image.

In some embodiments of the apparatus for object detection, a dual-threshold local binary pattern operator, such as a center-symmetric local binary pattern operator, can be used. In some embodiments, a threshold function of the dual-threshold local binary pattern operator is configured to return a first binary value if a difference between pixel values of two pixels in an image is between a lower threshold and an upper threshold, or return a second binary value if otherwise. In some embodiments, extracting the corresponding features within the band from the one or more images includes setting the lower threshold and the upper threshold based on the selected band of features from the plurality of bands of the pre-determined features of the target object; and generating a local binary pattern label for a pixel in an image of the one or more images based on pixel values of neighboring pixels of the pixel in the image, the lower threshold, and the upper threshold.

In some embodiments, the plurality of bands of the pre-determined features of the target object are determined using a classifier, such as a support vector machine, K-nearest neighbor, or clustering. In some embodiments, the plurality of bands of the pre-determined features of the target object are prioritized, and wherein selecting the band of features from the plurality of bands of the pre-determined features of the target object is based on the priorities of the plurality of bands of the pre-determined features of the target object.

In some embodiments, the apparatus for object detection further comprises means for tracking a region of interest in the one or more images. In some embodiments, the target object is at least one of a physical object, a human face, a human facial expression, or a human gesture.

In some embodiments, a system for object detection is disclosed. The system includes an imager configured to capture or receive one or more images, and a circuit configured to perform object detection using the one or more images in a staged process. Each stage of the staged process includes (a) selecting a different band of features from a plurality of bands of pre-determined features of a target object; (b) extracting, by a feature extractor, corresponding features within the band from the one or more images using a dual-threshold local binary pattern operator; (c) determining, by a classifier, whether a matching condition is met between the selected band of features from the plurality of bands of the pre-determined features of the target object and the corresponding features within the band extracted from the one or more images; and (d) exiting the staged process and generating a signal indicating that the target object is not detected when the matching condition is not met. The circuit is further configured to generate a signal indicating that the target object is detected if the matching condition is met at all stages of the staged process. In some embodiments, all corresponding features are extracted from one image. In some embodiments, the corresponding features extracted at each stage of the staged process are from a different image or multiple different images.

In some embodiments of the system for object detection, the dual-threshold local binary pattern operator is a center-symmetric local binary pattern operator. In some embodiments, a threshold function of the dual-threshold local binary pattern operator is configured to return a first binary value if a difference between pixel values of two pixels in an image is between a lower threshold and an upper threshold, or return a second binary value if otherwise. In some embodiments, extracting the corresponding features within the band from the one or more images includes setting the lower threshold and the upper threshold based on the selected band of features from the plurality of bands of the pre-determined features of the target object; and generating a local binary pattern label for a pixel in an image of the one or more images based on pixel values of neighboring pixels of the pixel in the image, the lower threshold, and the upper threshold.

In some embodiments of the system for object detection, the plurality of bands of the pre-determined features of the target object are determined using a classifier, such as a support vector machine, K-nearest neighbor, or clustering. In some embodiments, the plurality of bands of the pre-determined features of the target object are prioritized, and wherein selecting the band of features from the plurality of bands of the pre-determined features of the target object is based on the priorities of the plurality of bands of the pre-determined features of the target object.

In some embodiments, the system for object detection further comprises an image processor capable of tracking a region of interest in the one or more images. In some embodiments, the target object is at least one of a physical object, a human face, a human facial expression, or a human gesture.

Also disclosed herein is an article comprising a non-transitory storage medium. The non-transitory storage medium includes machine-readable instructions stored thereon that are executable by a special purpose computing device to (a) receive or capture one or more images; (b) perform object detection using the one or more images in a staged process, wherein each stage of the staged process includes (i) selecting a different band of features from a plurality of bands of pre-determined features of a target object; (ii) extracting corresponding features within the band from the one or more images using a dual-threshold local binary pattern operator; (iii) determining whether a matching condition is met between the selected band of features from the plurality of bands of the pre-determined features of the target object and the corresponding features within the band extracted from the one or more images; and (iv) exiting the staged process and generating a signal indicating that the target object is not detected when the matching condition is not met; and (c) generate a signal indicating that the target object is detected if the matching condition is met at all stages of the staged process. In some embodiments, all corresponding features are extracted from one image. In some embodiments, the corresponding features extracted at each stage of the staged process are from a different image.

In some embodiments of the article, the dual-threshold local binary pattern operator is a center-symmetric local binary pattern operator. In some embodiments, a threshold function of the dual-threshold local binary pattern operator is configured to return a first binary value if a difference between pixel values of two pixels in an image is between a lower threshold and an upper threshold, or return a second binary value if otherwise. In some embodiments, extracting the corresponding features within the band from the one or more images includes setting the lower threshold and the upper threshold based on the selected band of features from the plurality of bands of the pre-determined features of the target object; and generating a local binary pattern label for a pixel in an image of the one or more images based on pixel values of neighboring pixels of the pixel in the image, the lower threshold, and the upper threshold.

In some embodiments of the article, the plurality of bands of the pre-determined features of the target object are determined using a classifier, such as a support vector machine, K-nearest neighbor, or clustering. In some embodiments, the plurality of bands of the pre-determined features of the target object are prioritized, and wherein selecting the band of features from the plurality of bands of the pre-determined features of the target object is based on the priorities of the plurality of bands of the pre-determined features of the target object.

In some embodiments of the article, the non-transitory storage medium further comprises machine-readable instructions stored thereon that are executable by the special purpose computing device to track a region of interest in the one or more images. In some embodiments, the target object is at least one of a physical object, a human face, a human facial expression, or a human gesture.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings.

FIGS. 3A-3D illustrate an example process of converting image data into a histogram based on local binary pattern (LBP) labels, wherein FIG. 3A illustrates an area of interest in a captured image, FIG. 3B illustrates a cell of a 3×3 pixel array from the area of interest, FIG. 3C illustrates the LBP label for the cell, and FIG. 3D illustrates a histogram of the LBP labels for cells in the area of interest.

FIGS. 4A-4D illustrate a method of generating a local binary pattern label for a cell in an image, wherein FIG. 4A illustrates a cell with a center pixel and 8 equally spaced neighbor pixels on a circle, FIG. 4B illustrates the differences between the neighbor pixels and the center pixel, FIG. 4C illustrates binary values for the neighbor pixels, and FIG. 4D illustrates the generated LBP label in binary format and decimal format.

FIGS. 7A-7C illustrate examples in which gradients of low to high contrast may be indistinguishable using CS-LBP operator with one threshold value, wherein FIG. 7A illustrates the CS-LBP label for a cell with low contrast, FIG. 7B illustrates the CS-LBP label for a cell with medium contrast, and FIG. 7C illustrates the CS-LBP label for a cell with high contrast.

FIGS. 8A-8F illustrate CS-LBP labels for an image cell using different threshold values, wherein FIG. 8A illustrates gray levels of pixels in the image cell, FIG. 8B illustrates the CS-LBP label for the image cell with a threshold of 20, FIG. 8C illustrates the CS-LBP label for the image cell with a threshold of 40, FIG. 8D illustrates the CS-LBP label for the image cell with a threshold of 80, FIG. 8E illustrates the CS-LBP label for the image cell with a threshold of 160, and FIG. 8F illustrates the CS-LBP label for the image cell with a threshold of greater than 160.

FIGS. 9A-9E illustrate dual-threshold CS-LBP labels for the image cell shown in FIG. 8A with different threshold settings, wherein FIG. 9A illustrates the dual-threshold CS-LBP label for the image cell with thresholds of $T_1=20$ and $T_2=40$, FIG. 9B illustrates the dual-threshold CS-LBP label for the image cell with thresholds of $T_1=40$ and $T_2=80$, FIG. 9C illustrates the dual-threshold CS-LBP label for the image cell with thresholds of $T_1=80$ and $T_2=160$, FIG. 9D illustrates the dual-threshold CS-LBP label for the image cell with thresholds of $T_1=160$ and $T_2=256$, and FIG. 9E illustrates the dual-threshold CS-LBP label for the image cell with thresholds of $T_1=161$ and $T_2=256$.

FIGS. 10A-10E illustrate dual-threshold CS-LBP labels for the image cell shown in FIG. 8A with different threshold settings, which are identical to the labels generated using single-threshold CS-LBP operators as shown in FIGS. 8B-8F. FIG. 10A illustrates the dual-threshold CS-LBP label for the image cell with thresholds of $T_1=20$ and $T_2=256$, FIG. 10B illustrates the dual-threshold CS-LBP label for the image cell with thresholds of $T_1=40$ and $T_2=256$, FIG. 10C illustrates the dual-threshold CS-LBP label for the image cell with thresholds of $T_1=80$ and $T_2=256$, FIG. 10D illustrates the dual-threshold CS-LBP label for the image cell with thresholds of $T_1=160$ and $T_2=256$, and FIG. 10E illustrates the dual-threshold CS-LBP label for the image cell with thresholds of $T_1=161$ and $T_2=256$.

DETAILED DESCRIPTION

Several illustrative embodiments will now be described with respect to the accompanying drawings, which form a part hereof While particular embodiments, in which one or more aspects of the disclosure may be implemented, are described below, other embodiments may be used and various modifications may be made without departing from the scope of the disclosure or the spirit of the appended claims.

An object detection technique based on incremental feature extraction of selective band of features, such as gradient magnitudes, is disclosed. In various embodiments, instead of extracting all features in images at once and making a comprehensive determination based on all extracted features, features of the images within a band are extracted at each stage of a plurality of stages using a band-pass feature extractor, such as a local binary pattern operator, and only a partial decision is made at each stage until a rejection decision is made or until no rejection decision is made at any stage of the plurality of stages. As a result, at any stage of the object detection, if characteristic features of a target object, for example, discriminative, distinctive or common features of a population of the target object, are missing in the images, no more image processing or feature extraction will be necessary for the images. Thus, unnecessary data processing can be avoided.

Methods and systems disclosed herein may be used for detecting an object, such as a person, a building, or other physical object. In some embodiments, the methods and systems disclosed herein can be used for detecting a human face, an expression of a human face, or a gesture of a person. In some other embodiments, the disclosed methods and systems can be used to detect an event, such as a motion. The disclosed methods and systems may be used in a single-frame or a multi-frame context.

By way of example, in an always-on application of a mobile device, a majority of the mobile device may enter a low power mode with only a portion of the mobile device in active mode for detecting a presence or an activity of a user. The portion of the mobile device in active mode may repeatedly capture images in the field of view of the mobile device before a target object, such as a person, an expression of a person, or a gesture of a person, is detected. If the target object is detected in the captured images, the mobile device may enter an active mode. Otherwise, the majority of the mobile device remains in the low power mode, and the portion of the mobile device in active mode continues to detect the target object.

I. Object Classification

A. System Architecture

Figure 1:
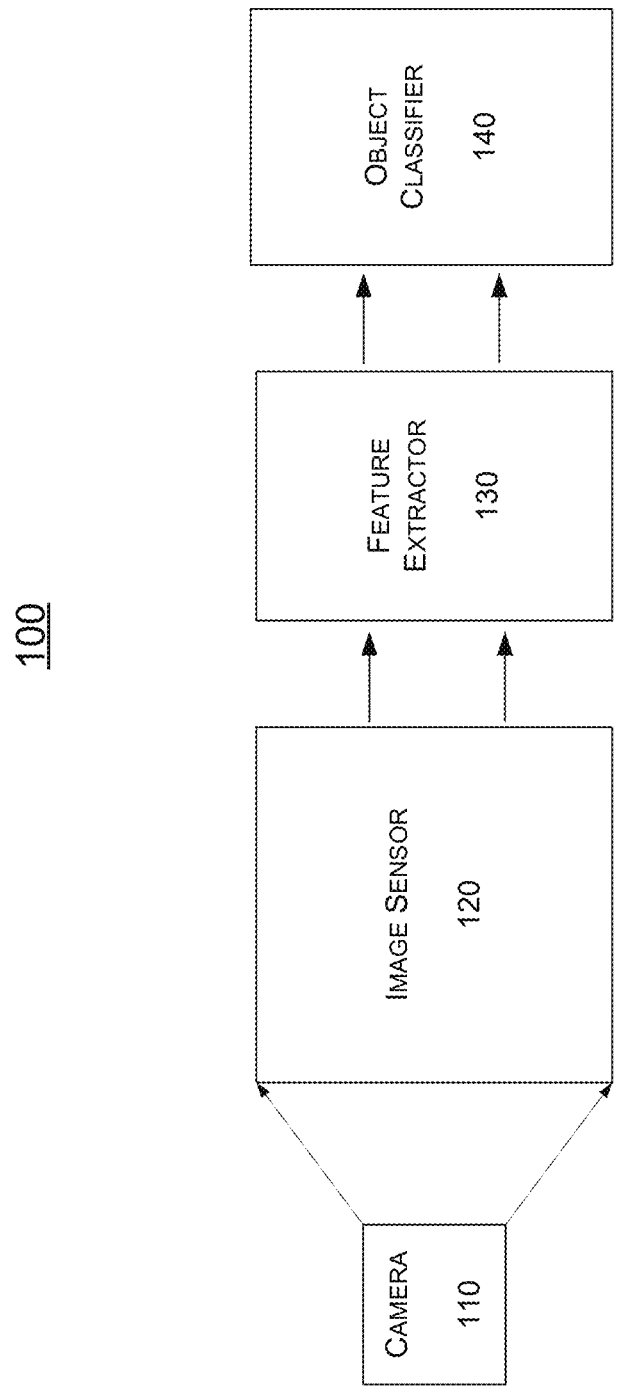
FIG. 1 illustrates an example block diagram of a computer vision based object detection system.

FIG. 1 illustrates an example block diagram of a computer vision based object detection or classification system 100. As illustrated, system 100 includes a camera 110, an image sensor 120, a feature extractor 130 and an object classifier 140. System 100 may be a stand-alone device or may be a part of a mobile device, such as a cellular phone or a tablet. As shown in FIG. 1, camera 100 projects an image on image sensor 120, which generates image data of the image. The image data may be temporarily stored in a memory device, such as an SRAM device, for later processing. Feature extractor 130 extracts features of interest from the image data. Object classifier 140 compares the extracted features from the image data with expected features of a target object, and determines the existence or non-existence of the target object in the image.

Camera 110, image sensor 120, feature extractor 130 and object classifier 140 may be implemented in various different configurations at various different granularities. For example, image sensor 120 may represent a single sensor element or the entire sensor array. Feature extractor 130 may be implemented as on-chip sensor circuitry, dedicated peripheral circuitry, firmware/software instructions executable on a general-purpose or special-purpose processor, or any combination thereof. Object classifier 140 may be implemented as on-chip sensor circuitry, peripheral circuitry, firmware/software instructions executable on a general-purpose or special-purpose processor, or any combination thereof. Feature extractor 130 and object classifier 140 may be configured to perform digital operations, analog operations or mixed digital and analog operations. Feature extractor 130 and object classifier 140 may be implemented as firmware/software instructions executable on a same general-purpose or special-purpose processor.

Feature extractor 130 may extract features, such as edges, corners, textures, gradients, and complex human features such as faces, smiles and gestures. Examples of feature extraction techniques that may be used by feature extractor 130 include, but are not limited to, local binary pattern (LBP) operations, histogram of oriented gradients (HOG) operations, various modifications or improvements to LBP and HOG, and any combination thereof.

Object classifier 140 may classify extracted features of the image using techniques, such as supervised machine learning classification techniques, including K-nearest neighbor (KNN), trees, Naïve Bayes, logistic regression and support vector machine (SVM).

Figure 2:
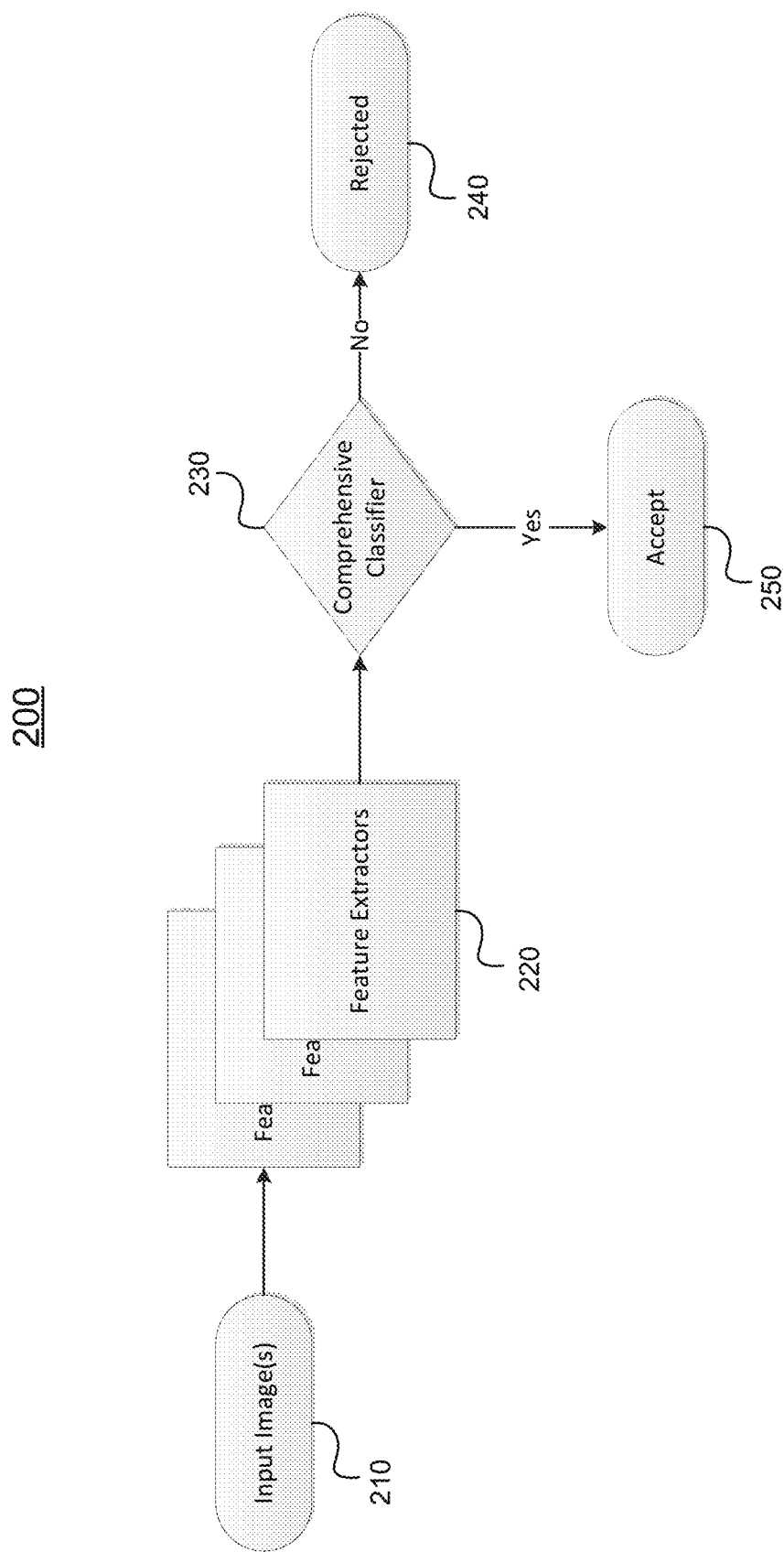
FIG. 2 is a flow chart illustrating a method of object detection or classification using an acquired image.

FIG. 2 is a flow chart illustrating a process 200 for object detection or classification from acquired image(s) using, for example, system 100 of FIG. 1. At block 210, image data used for object detection is acquired or received. At block 220, features of the image data are extracted using a series of feature extractors. At block 230, a comprehensive classifier classifies the image data based on features of a target object and the extracted features of the image data using various classification techniques as described above. At block 240, if certain essential characteristic features of the target object are absent in the extracted features of the image data, the image is rejected as not containing the target object. At block 250, if all characteristic features of the target object are present in the extracted features of the image data, the image is classified as containing the target object.

The feature extraction and object classification in process 200 may be power and processing intensive. For example, feature extraction may involve power and processing intensive operations, such as storing image data from sensors in memory, fetching image data and instructions from memory for feature extraction, and storing extracted features for later classification. Classification techniques, such as machine learning classification techniques, may also be power and processing intensive when a large number of features are used for a comprehensive classification. Various embodiments of the disclosure use improved feature extraction techniques for incremental feature extraction in a series of stages, and make partial object classification at various earlier stages, rather than extracting all features of the image before making a comprehensive final classification using all the extracted features, thus reducing overall operations and power consumption.

B. Feature Extraction

Feature extraction is very important to object detection and classification. It is desirable that extracted features are robust, discriminative, compact and efficient. Various techniques for extracting discriminative and robust image features have been used in pedestrian detection, such as Haar wavelets, region covariance, HOG, and pyramid HOG (PHOG). HOG has been successfully used in pedestrian detection, but it is computationally intensive. Local binary pattern (LBP) and extended versions of LBP have been used for illumination invariant feature extraction, and outperform many existing feature extraction techniques.

1. Local Binary Pattern (LBP)

Local feature detection and description have gained a lot of interest since photometric descriptors computed for interested regions have proven to be successful in many applications. The basic idea of local feature detection is to first detect interested regions that are covariant to a class of transformations. Then, for each detected region, invariant descriptors are built. Once the descriptors are computed, interested regions can be matched between images.

Local binary pattern is a powerful gray level invariant texture primitive for texture description. LBP describes each pixel by the relative gray levels of its neighboring pixels, and can be computed as follows:

$$LBP_{R,N}(x, y) = \sum_{i=0}^{N-1} s(n_i - n_c) \times 2^i, \quad (1)$$

$$s(g) = \begin{cases} 0, & g < T \\ 1, & g \geq T \end{cases}, \quad (2)$$

where (x, y) is the location of the pixel in the image, s( ) is a threshold function, $n_c$ corresponds to the gray level of the center pixel of a local neighborhood, and $n_i$ corresponds to the gray level of the ith pixel of N equally spaced pixels on a circle of radius R. The values of neighbors that do not fall on pixels may be estimated using bilinear interpolation. If a difference between the gray level of a neighbor pixel and the gray level of the center pixel is no less than a threshold value T, such as 0, a "1" is assigned to the bit representing the neighbor pixel. Otherwise, a "0" is assigned to the bit representing the neighboring pixel. Thus, LBP of a center pixel is represented by an N-bit binary number, each corresponding to a neighbor pixel. The LBP descriptor has several properties that favor its usage in feature extraction from interested region. The features described by the LBP operator are robust against illumination changes, are easy and fast to compute, do not require many parameters to be set, and have high discriminative power.

Figures 3A, 3B, 3C, 3D:
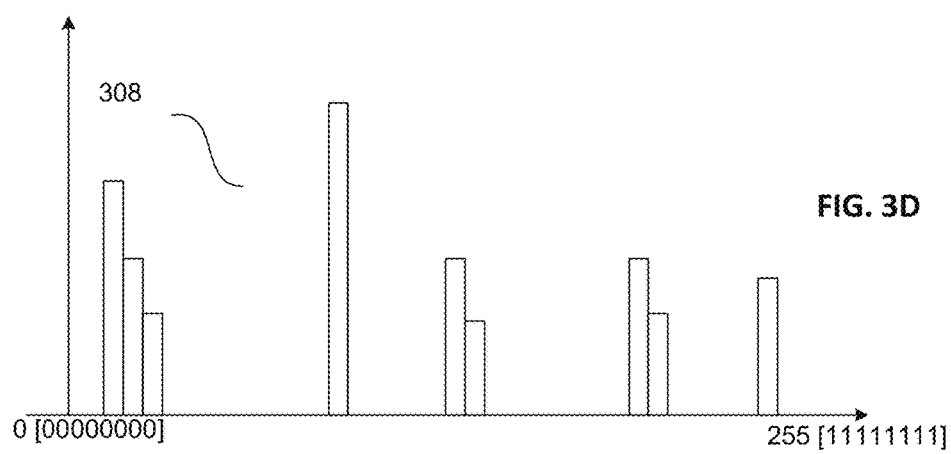

FIGS. 3A-3D illustrate an example process of converting image data into a histogram for classification using LBP labels. As shown in FIG. 3A, an interested area or an examined window 302 of an image is divided into overlapping cells 304, which may include, for example, a 3×3 or 4×4 pixel array in each cell. Each pixel may be represented by a value of gray level. For each cell 304 as shown in FIG. 3B, an LBP label can be generated. As shown in FIG. 3C, for each pixel in cell 304, a center pixel 306 is compared with each of its neighbors along a circle clockwise or counter-clockwise, for example, 8 neighbors for a cell of 3×3 pixel array from right, bottom, left, to top of center pixel 306. When the value of center pixel 306 is greater than a neighbor's value, a "1" is assigned to the bit representing the neighbor. Otherwise, a "0" is assigned to the bit representing the neighbor. This produces an LBP label represented by an 8-digit binary number, which is usually converted to decimal number for convenience. A detailed example of determining an LBP label for a cell is illustrated in FIGS. 4A-4D.

Figures 4A, 4B, 4C, 4D:
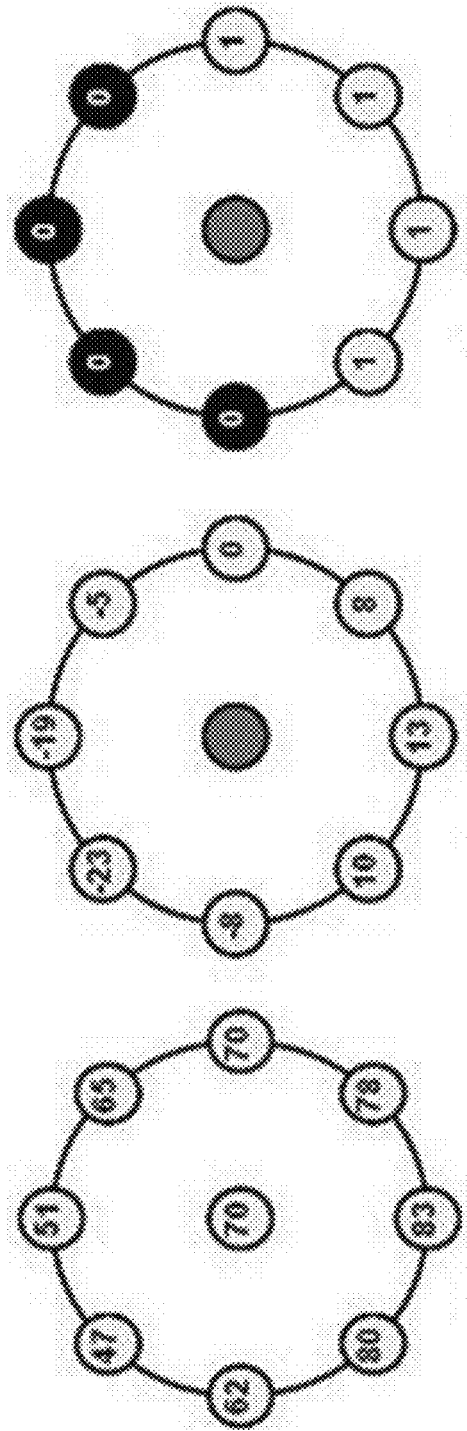

FIG. 4A illustrates several example image pixel values, with a center image pixel value of 70 and eight neighboring image pixel values. In FIG. 4B, a difference is generated for each neighbor by subtracting the center image pixel value from each of the neighboring image pixel values. In FIG. 4C, a binary value is generated for each neighboring pixel using a threshold of, for example, 0. Thus, all resultant negative difference values in FIG. 4B are converted to zero's, and all remaining values in FIG. 4B are converted to one's. In FIG. 4D, an LBP label is generated for the center image pixel by either concatenating the 8 binary values representing the 8 neighboring image pixels, for example "00001111," or summing up the binary values multiplied by 2 raised to the power of the placement of the image pixel, resulting in a decimal LBP label value of 15 for the center image pixel.

Referring back to FIG. 3D, after LBP labels for all cells in the interested area are generated, the LBP labels can be used to generate a histogram 308 indicating the frequency of occurrence of each decimal number, which represents feature vectors for the interested area of the image. Each of the LBP labels may fall anywhere on a histogram with 255 slots. Certain histogram patterns may represent corners, edges, texture, gradients etc. in an image. The histogram may optionally be normalized. The feature vectors can then be processed based on statistics or heuristics using support vector machine (SVM) or other machine-learning techniques for identifying or detecting an object from the image through, for example, face recognition or texture analysis.

2. Center-Symmetric Local Binary Pattern (CS-LBP)

LBP operator produces rather long histograms, thus requires more power. Furthermore, LBP operator is not very robust on flat image areas and thus is difficult to use in the context of orientation and gradient description. Center-symmetric local binary pattern (CS-LBP) operator is a modified version of LBP that computes the pixel gradients from pairs of center-symmetric pixels (pairs of pixels if a straight line connecting each pair of pixel passes through a center pixel), rather than comparing the center pixel with its neighboring pixels.

Figure 5:
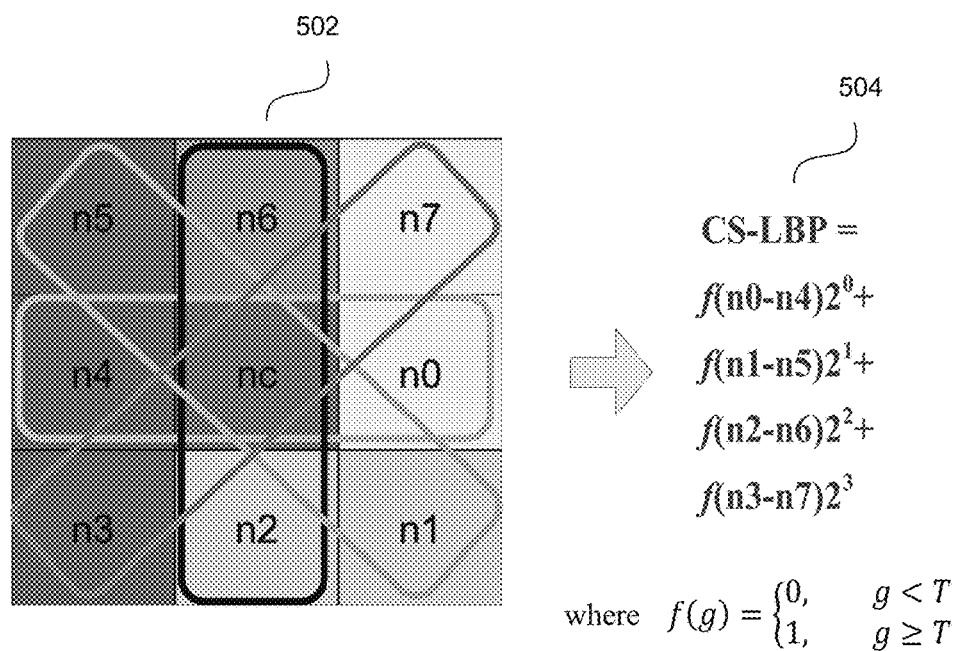
FIG. 5 illustrates an example of center-symmetric local binary pattern (CS-LBP) label generation.

In CS-LBP, the center pixel is only used for determining the location of a cell; it is not used for the computation of binary CS-LBP labels. As shown in FIG. 5, graphically, CS-LBP computes the pixel gradients from pairs of center-symmetric pixels. Qualitatively, CS-LBP extracts edges or spatial gradients including direction, but ignoring other features such as spatial frequency or phase. The CS-LBP operator can be described as follows:

$$CS-LBP(x,y) = \sum_{i=0}^{(\frac{N}{2})-1} f(n_i - n_{i+(\frac{N}{2})}) \times 2^i, \quad (3)$$

$$f(g) = \begin{cases} 0, & g < T \\ 1, & g \geq T \end{cases}, \quad (4)$$

where (x, y) is the location of the cell in an image, N is the number of neighbors in the cell, i is the index for the center-symmetric pair of pixels, $n_i$ is the gray level of the ith pixel, g is the gradient magnitude of a pair of center-symmetric pixels, T is a threshold value, and f( ) is a threshold function. The ith output bit at the center pixel location (x, y) is set to 1 if the ith gradient (the difference in gray level between pixel i and pixel i+(N/2)) is larger than or equal to T, otherwise the output bit is set to 0. In the example shown in FIG. 5, a center cell $n_c$ in a cell 502 has 8 neighbors, where $n_0$ and $n_4$, $n_1$ and $n_5$, $n_2$ and $n_6$, and $n_3$ and $n_7$ are four center-symmetric pixel pairs. The CS-LBP label of cell 502 can be calculated using an equation 504.

After CS-LBP labels are created for all cells in an interested region in an image, a histogram similar to histogram 308 shown in FIG. 3D may be generated and used for comparison with corresponding characteristic features of the target object by a classifier as described above.

CS-LBP has been successfully applied to visual recognition, including face recognition. The gain of CS-LBP over LBP is not only due to the dimensionality reduction, but also due to the fact that CS-LBP captures gradient information better than the basic LBP. CS-LBP is similar to histogram of oriented gradients (HOG) feature in that they both extract orientations and gradients of edges from an image, while discarding spatial frequency and phases information (such as Gabor filters). However, HOG uses 7 bits (representing 0.00 to 1.00) to encode the magnitude of a gradient, while CS-LBP uses only one bit. Thus, CS-LBP is advantageous over HOG in dimensionality reduction and computation reduction.

II. Multi-Stage Incremental Object Detection

In various embodiments of the disclosure, to reduce the amount of computation and data storage and thus the corresponding power consumption, multi-stage incremental feature extraction and object detection methods are used in replacement of method described above with respect to FIG. 2. In such methods, an image may be rejected as not containing a target object if some subset of features of the target object is not present in the image.

Figure 6:
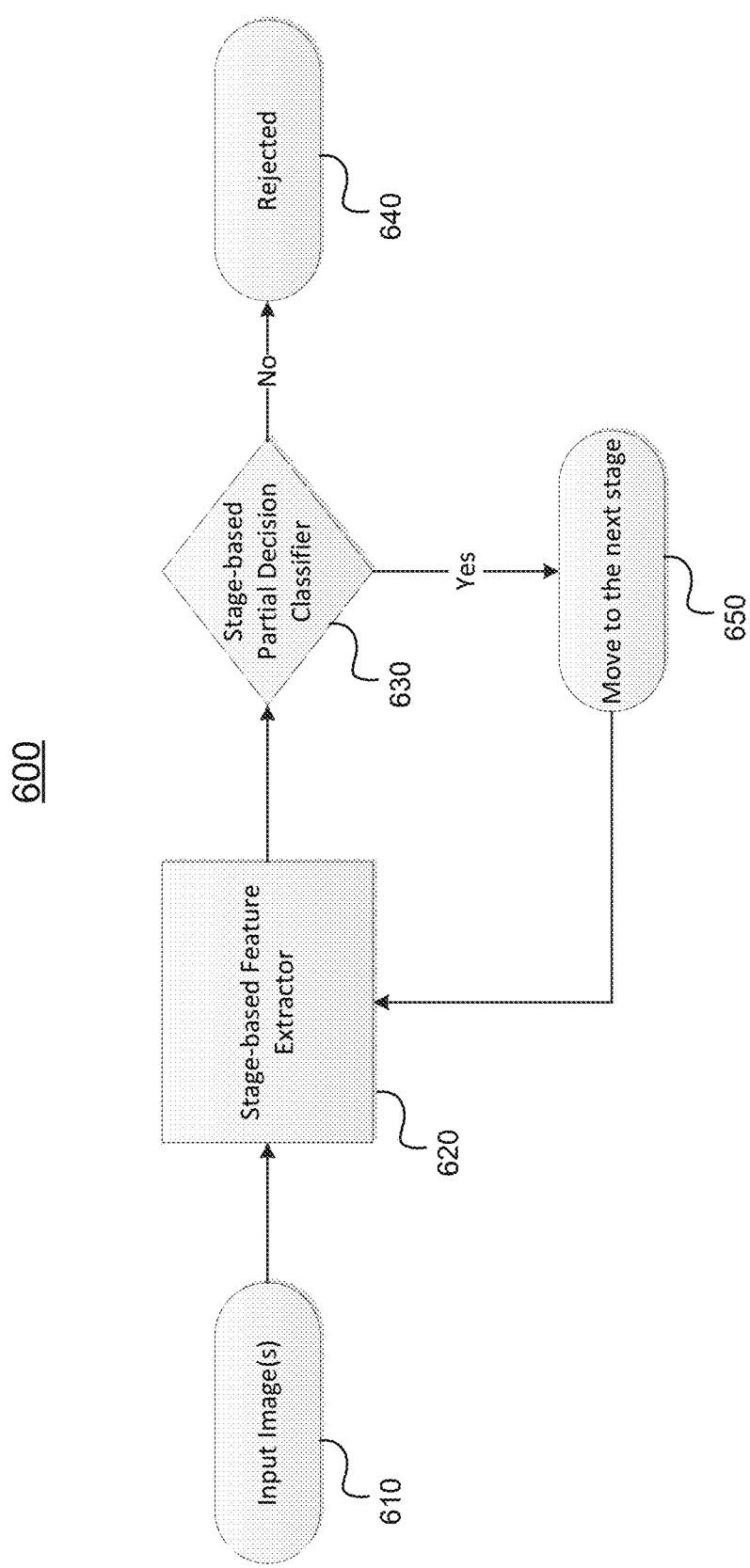
FIG. 6 illustrates a flow chart of an incremental feature extraction and object detection method.

FIG. 6 illustrates an incremental feature extraction and object detection method 600, where subsets of features are extracted and compared at a series of stages. At block 610, image data used for object detection is acquired or received. At block 620, a subset of features of interest can be extracted from the acquired image data. At block 630, the subset of features of interest is compared with a corresponding subset of characteristic features of a target object. If the corresponding subset of characteristic features of the target object does not exist in the image, the image data is rejected as not containing the target object at block 640. At block 650, if the corresponding subset of characteristic features of the target object matches the subset of features of interest extracted from the acquired image data, another subset of features of interest may be extracted from the image data at a next stage at block 620, and compared with another corresponding subset of characteristic features of the target object at block 630. In any stage, if the subset of features of interest extracted from the acquired image data does not match the corresponding subset of characteristic features of the target object, the image data is rejected as not containing the target object at block 640. If all subsets of features of interest extracted from the acquired image data match the corresponding subsets of features of the target object, the target object is detected.

The method according to FIG. 6 may reject an image by only extracting a subset or several subsets of features of interest from the image and comparing with corresponding subset(s) of characteristic features of a target object without having to extract all features of the image. In some embodiments, features of the target object may be ranked such that features corresponding to the most distinctive or most frequent features of the target object may be extracted and classified first. Features corresponding to less distinctive or less frequent features of the target object are extracted and classified in subsequent stages in a descending order only if the more distinctive or more frequent features of the target object are present in the acquired image. In this way, the total amount of computation and the total amount of data storage and access can be greatly reduced because not all features of the image may be extracted, stored and compared. The amount of reduction in computation and data storage is even more significant in applications such as always-on applications, where images may be constantly and continuously captured and analyzed until an object, an expression of the object, or a gesture of the object is detected.

Furthermore, in many situations, for example, when only gradient magnitudes need to be extracted, or when only a subset or several subsets of features of interest need to be extracted at a stage, a lower resolution image that requires less data storage and processing may be use. This may be done by capture images using a low resolution camera, such as a low-resolution always-on camera, or a camera at a low resolution setting. In some embodiments, a high-resolution image may be sub-sampled or spatially averaged to generate a lower resolution image for feature extraction. For example, an image with 800×600 pixels may be reduced to an image with 160×120 pixels or less. In some embodiments, the resolution of an image may be selected based on features of interest to be extracted from the image. In some embodiments, images of different resolutions may be used at different stages. For example, at one stage, a low resolution image may be used, and at another stage, a higher resolution image may be used.

For a multi-stage incremental feature extraction and object detection method to be more efficient, it is desirable to extract features of an image in any narrow or wide band of interest in a single pass, in other words, filtering the image with a band-pass filter based on characteristic features of the target object, rather than using only one threshold for high-pass filtering in each pass according to threshold functions described by Equations (2) and (4), and a combination of two or more high-pass filtering passes to extract features in a band.

III. Band-Pass Feature Extraction Using Dual Thresholds

LBP and CS-LBP are binary feature descriptors, thus they are designed to trade-off precision for memory and computational efficiency. However, such trade-off may hurt the outcome in some applications, depending on the desired precision of a specific application. Conventional LBP or CS-LBP operator where this trade-off is made with one threshold value is inflexible. For example, in pedestrian detection, it has been demonstrated that binary feature extraction may degrade the detection performance.

While CS-LBP and HOG are similar in that they both extract directional gradients, HOG has the benefit of using 7 bits to encode the magnitude of a gradient with a better resolution, while CS-LBP only uses 1 bit. As a result, CS-LBP may exhibit aliasing problem and may not be able to distinguish high-contrast edges and weak-contrast edges as illustrated by the examples below.

Figure 7A:
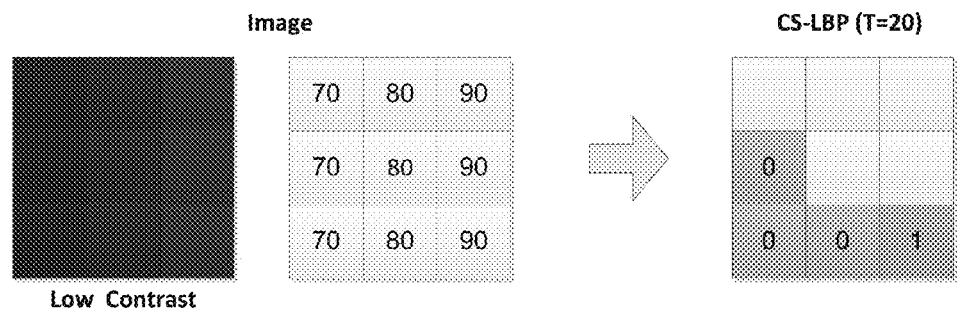
Figure 7B:
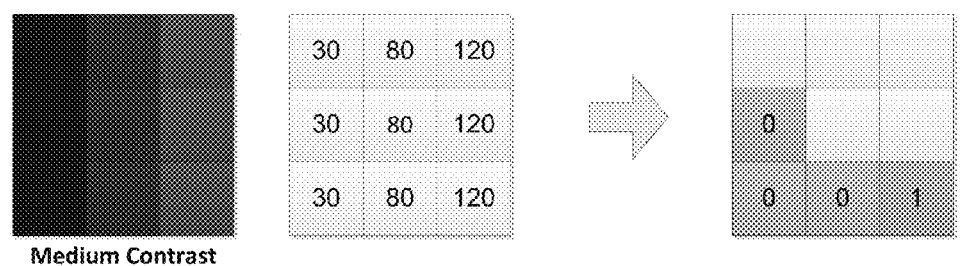
Figure 7C:
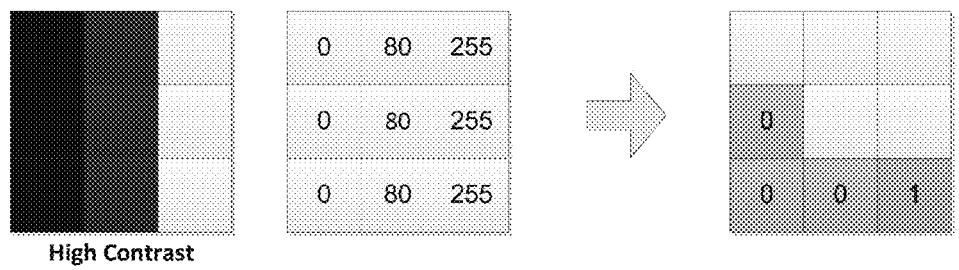

FIGS. 7A-7C illustrate examples in which gradients of low to high contrast may be indistinguishable using CS-LBP operator with one threshold value. As shown in FIGS. 7A-7C, when a threshold of the CS-LBP operator is set to 20, cells with low contrast (FIG. 7A), medium contrast (FIG. 7B) and high contrast (FIG. 7C) may have the same CS-LBP labels and thus is indistinguishable from each other. This drawback of CS-LBP can limit the application of CS-LBP. For example, in human detection applications, representing the magnitude of gradients with higher resolution as in HOG is important for successful identification.

To distinguish features of different gradients using CS-LBP, a different threshold may be set in each of multiple passes to extract features. In each pass, the extracted features may be compared with features of the target object, and the results from two or more passes may be combined by bit-wise operations to distinguish features of different gradients. For example, a cell in an image with gray level values for the pixels in the cell as shown in FIG. 8A includes four different ranges of embedded gradients represented by differences in gray level between opposing pixels, including weak gradients, moderate gradients, strong gradients, and very strong gradients. When a threshold for CS-LBP operation is set to 20, all gradients may be selected as shown in FIG. 8B. When the threshold is set to 40, all but the weak gradients are selected as shown in FIG. 8C. When the threshold is set to 80, only strong and very strong gradients are selected as shown in FIG. 8D. When the threshold is set to 160, only very strong gradients can be selected as shown in FIG. 8E. When the threshold is set to a value greater 160, only the strongest gradients, which do not exist in the cell, can be selected as shown in FIG. 8F. Therefore, to select, for example, only the strong gradients but not the very strong gradients (difference in gray level of between 80 and 160), two feature extraction passes may be used. In a first pass, the threshold for the CS-LBP operation may be set to 80 to generate a CS-LBP label "0011" as shown in FIG. 8D. In a second pass, the threshold for the CS-LBP operation may be set to 160 to generate a CS-LBP label "0001" as shown in FIG. 8E. The CS-LBP labels generated in the first pass and the second pass are classified, and the results are combined. Alternatively, the CS-LBP labels generated in the first pass and the second pass can be bit-wise XORed to generate a label "0010," which represents features with gradients between 80 and 160.

Therefore, it would be advantageous to devise a method such that a multi-bit entity (such as a gradient magnitude) can be sufficiently represented by a binary pattern, thus applications that require more than 1 bit for feature representation are still feasible with a binary feature descriptor such as LBP or CS-LBP.

Furthermore, as explained above, a band-pass filtering or extraction of features of interest in a band may reduce the number of feature extractions and comparisons to half of the number of feature extractions and comparisons using two or more high-pass filtering passes and a bit-wise operation on the results from the two or more passes.

A typical LBP or CS-LBP only has one threshold, thus is difficult to extract features within an interested range in one pass. In various embodiments of the disclosure, a modified LBP or CS-LBP label is used for stage-based incremental feature extraction of selective band-pass gradient magnitudes, by adding a second threshold $T_2$, and modifying the threshold function such that, in the case of CS-LBP, $$f(g) = \begin{cases} 1, & T_1 \le g < T_2 \\ 0, & \text{otherwise} \end{cases} \quad (5)$$

and information of magnitudes of gradients within a range between a lower threshold $T_1$ and an upper threshold $T_2$ can be extracted. Similarly, the threshold function s( ) of LBP operation can be modified as $$s(g) = \begin{cases} 1, & T_1 \le g < T_2 \\ 0, & \text{otherwise} \end{cases} \quad (6)$$

Such extension to LBP or CS-LBP operator enables one to capture features in a specific band of interest while retaining the same output format of LBP or CS-LBP. In other words, 1-bit output of a dual-threshold LBP or CS-LBP may capture features with a potentially multi-bit dynamic range.

In various embodiments, the threshold function may be of other forms that can return a binary value using two thresholds. For example, the threshold function may return a "0" if g is between $T_1$ and $T_2$ and return a "1" otherwise, thus acting as a band-stop filter or a notch filter. The threshold function may also return a "1" if $T_1 < g \le T_2$.

As shown in FIG. 9, the use of a lower threshold $T_1$ and an upper threshold $T_2$ enables the CS-LBP operator to function as a band-pass filter of gradient magnitudes. By specifying appropriate thresholds $T_1$ and $T_2$, gradients of different strengths can be extracted from the image in a single pass. For example, for the cell shown in FIG. 8A, when $T_1$ is set to 20 and $T_2$ is set to 40, features with gradients of between 20 and 40 can be extracted as shown in FIG. 9A. When $T_1$ is set to 40 and $T_2$ is set to 80, features with gradients of between 40 and 80 can be extracted as shown in FIG. 9B. When $T_1$ is set to 80 and $T_2$ is set to 160, features with gradients of between 80 and 160 can be extracted as shown in FIG. 9C. When $T_1$ is set to 160 and $T_2$ is set to 256, features with gradients of between 160 and 256 can be extracted as shown in FIG. 9D. When $T_1$ is set to 161 and $T_2$ is set to 256, features with gradients greater than 160 can be extracted as shown in FIG. 9E. Thus, theoretically speaking, if $T_1$ is incremented from 0 to one less than the maximum gradient value and $T_2$ is set to $T_1+1$, any gradient magnitude can be distinguishably extracted with no loss of any gradient magnitude information as compared to HOG.

Additionally, a dual-threshold LBP or CS-LBP operator is a superset of single-threshold LBP or CS-LBP. For example, by setting $T_2$ to the maximum gradient value in the image, labels generated by a dual-threshold CS-LBP operator as shown in FIGS. 10A-10E are identical to the labels generated by a single-threshold CS-LBP as shown in FIGS. 8B-8F. Thus, a dual-threshold LBP or CS-LBP operator is more flexible than a single-threshold LBP or CS-LBP operator.

IV. Incremental Object Detection with Band-Pass Feature Extraction

With the selective band-pass capability of LBP and CS-LBP enabled by the introduction of a second threshold, an incremental feature extraction and object detection based on LBP or CS-LBP can be performed on single-frame or multi-frame images. With the second threshold, a specific range of features, such as gradient magnitudes, can be extracted in a single pass. For example, an object detection method using dual-threshold LBP or CS-LBP operator may reduce the number of feature extractions and classifications for an image by half compared to a method using single-threshold LBP or CS-LBP operators, and therefore can reduce the amount of computation and the amount of power consumption by half This method can be implemented in a single-image context or, more advantageously, in a multi-frame context, especially for always-on applications that are more power-sensitive.

For example, a particular range of gradient strengths can be extracted using a band-pass CS-LBP filter by setting appropriate thresholds $T_1$ and $T_2$. If characteristic features of the target object in the particular range are missing, there is no need for further processing. On the other hand, if characteristic features of the target object in the range are present, further features can be extracted with a new set of thresholds. The new set of thresholds may define a band that has no overlap or has some overlap with bands previously defined and examined Adjacent bands may be contiguous or may be separated by a gap between them.

Figure 11:
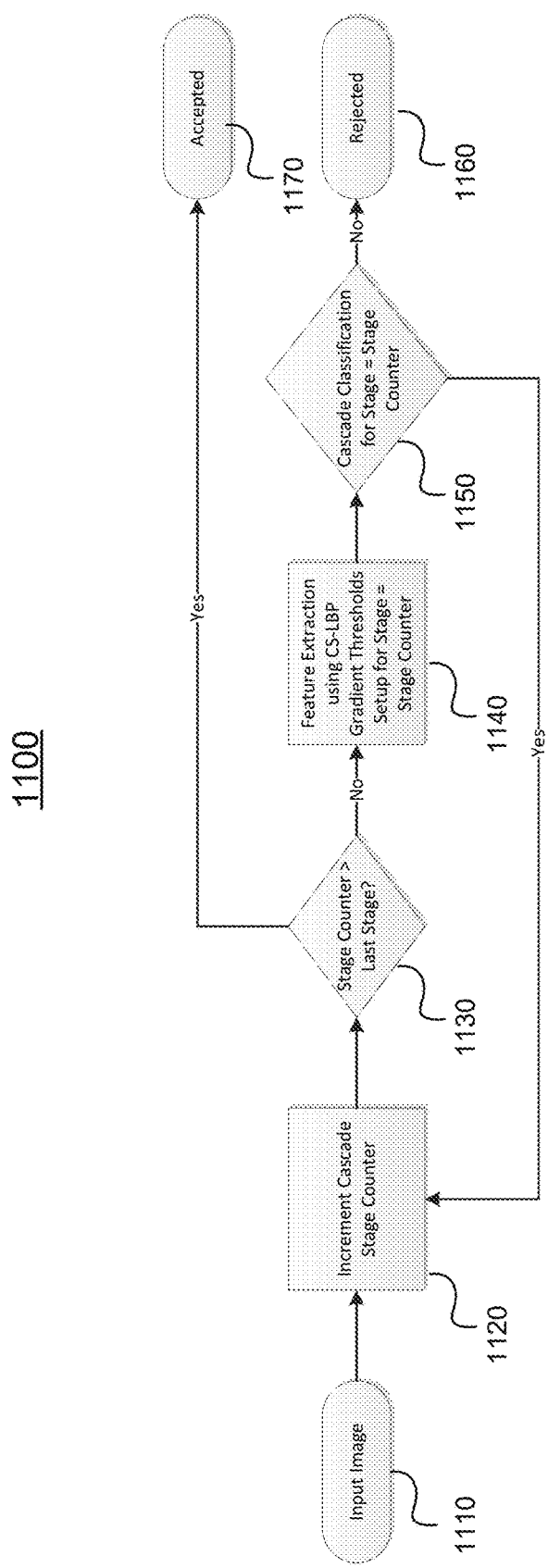
FIG. 11 is a flow chart illustrating a process of incremental object detection using single image frame.
Figure 12:
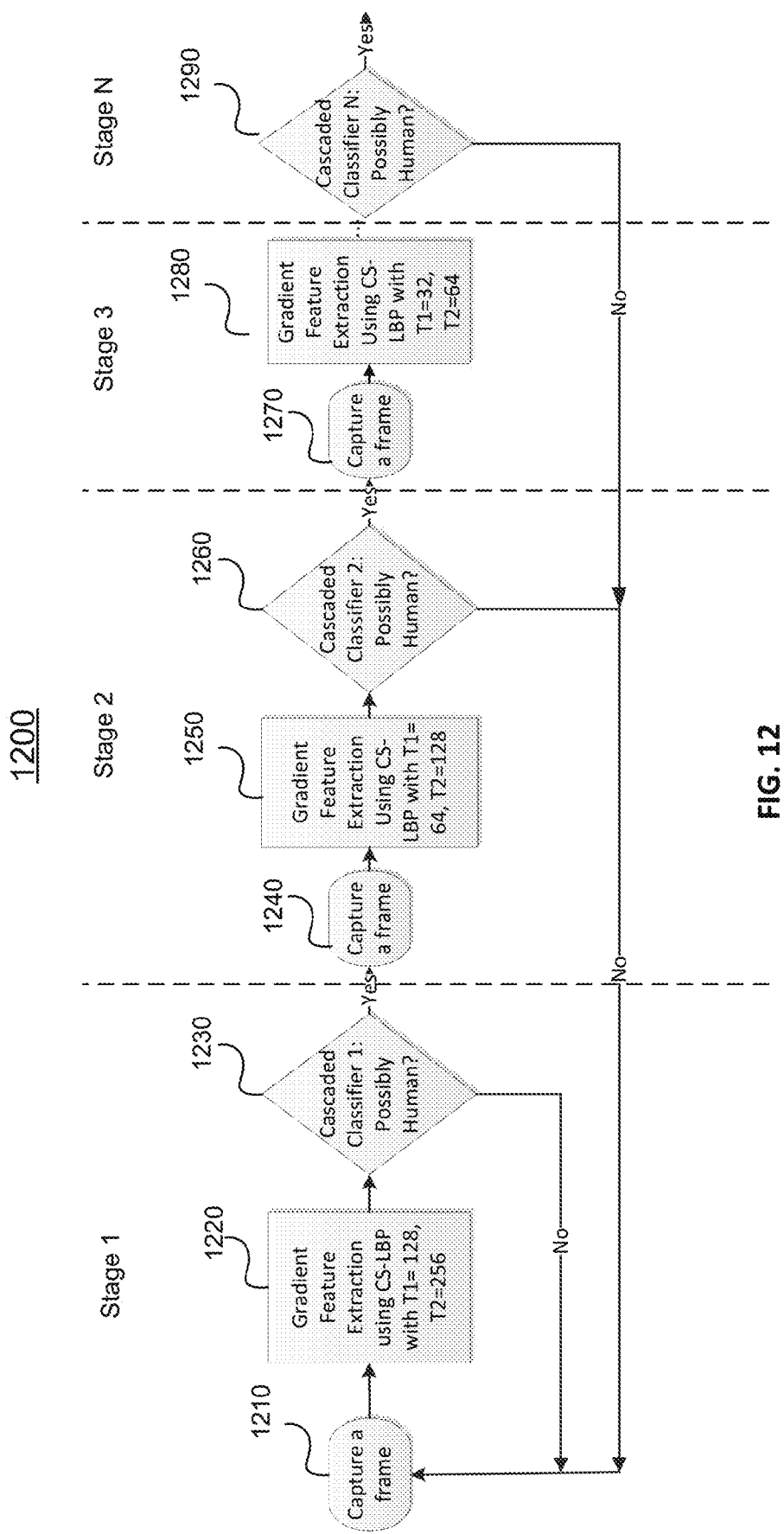
FIG. 12 is a flow chart illustrating an example process of incremental object detection using multiple image frames.

As illustrated in FIGS. 11 and 12, in some embodiments, an incremental object detection method using band-pass feature extractors may include receiving or capturing one or more images, and performing object detection using the one or more images at a plurality of stages in a staged process. Each stage of the plurality of stages in the staged process may include: (1) selecting a different band of features from a plurality of bands of pre-determined features of a target object; (2) extracting corresponding features within the band from the one or more images using a dual-threshold local binary pattern operator; (3) determining whether a matching condition is met between the selected band of features from the plurality of bands of the pre-determined features of the target object and the corresponding features within the band extracted from the one or more images; and (4) exiting the staged process and generating a signal indicating that the target object is not detected when the matching condition is not met. A matching condition may be met if a probability of matching is above a threshold value. If the matching condition is met at all stages of the staged process, a signal indicating that the target object is detected can be generated. All features extracted at the plurality of stages may be from a same image. Alternatively, features extracted at each stage of the plurality of stages may be from a different image of the one or more images. In some embodiments, features extracted at several stages of the plurality of stages may be from a same image.

Using methods such as supervised machine learning techniques, for example, K-nearest neighbor (KNN), trees, Naïve Bayes, logistic regression and support vector machine (SVM), or unsupervised machine learning techniques, for example, clustering, characteristic features of a target object in each band of a plurality of bands can be determined and prioritized with the most distinctive features ranked first and the least distinctive features ranked last. To further reduce power consumption, features to be extracted in each stage of a cascaded multi-stage object detection system can be selected based on the priorities of the features in the same order such that the most distinctive features are extracted and compared in the first stage and the least distinctive features are extracted and compared in the last stage, such that the object detection process may exit at an earlier stage for an image that does not contain the target object. Therefore, features to be extracted, and thus the thresholds for the feature extraction operator, such as LBP or CS-LBP, for each stage, can be pre-determined Other arrangements of the stages are also possible, such as based the commonality of the features in the population of the target object. In some embodiments, multiple bands of features may be used in combination in one stage.

After the dual-threshold LBP or CS-LBP labels for all cells in an interested area are generated using a specific set of thresholds, that is, features within a specific band are extracted, a histogram of the labels may be generated for comparison with characteristic features of the target object by a classifier, such as an SVM classifier, to determine whether a matching condition is met. In various embodiments, a matching condition is met if a probability of matching is above a certain threshold value.

In such a way, instead of extracting all features in image data and make a comprehensive final decision based on all extracted features, only a subset of features essential for a particular stage's decision may be extracted, and only a partial decision is made at each stage until a rejection decision is made or the final stage is reached. If a rejection decision is made at any classification stage, no more processing will be necessary, thereby saving unnecessary processing power.

A. Single-Frame Incremental Object Detection

FIG. 11 is a flow chart illustrating a process 1100 of incremental object detection, such as human face detection, on single image frame, using a dual-threshold CS-LBP operator. At block 1110, image data of an image frame is acquired or received by an object detection system, such as one described in FIG. 1. At block 1120, a cascade stage counter is incremented by 1 from a previous value, for example, from i−1 to 1. At block 1130, the stage counter value i is compared with the stage number of the last stage. If the stage counter value i is not greater than the stage number of the last stage, that is, the image has not been classified at all stages, CS-LBP gradient thresholds for stage i can be set based on the pre-determined band of features to be extracted and compared in stage i as describe above, and corresponding features within band i can be extracted from the image data using the thresholds at block 1140. The extracted features in band i can be classified using any suitable classification techniques, such as SVM and KNN at block 1150. If it is determined that the extracted features in band i do not match expected features of an target object in band i, the image is rejected as not containing the target object at stage 1160. A match may be found if a measure of sufficient similarity is met, for example, if a probability of matching is above a certain threshold value. If it is determined that the extracted features in band i match the expected features of the target object in band 1, the stage number is incremented by 1 to i+1 at block 1120. The stage counter value i+1 is again compared with the stage number of the last stage at block 1130. If the stage counter value i+1 is not greater than the stage number of the last stage, pre-determined thresholds for stage i+1 are used to extract features within band i+1 at block 1140, and the extracted features are classified at block 1150. If the stage counter value i+1 is greater than the stage number of the last stage, that is, the image has been classified by all stages and has not been rejected at any stage, the image is accepted as containing the target object at block 1170.

In single-frame incremental object detection described above, power consumption and computation reduction can be achieved in at least two ways. First, features of interest in any narrow or wide band can be extracted and compared in one pass. Second, if a rejection is made at any classification stage, the image is rejected and no more data processing is needed. However, the acquired image data may need to be saved for processing at a later stage during the process until the image is either rejected or accepted.

B. Multi-Frame Incremental Object Detection

In an always-on application, a camera continuously captures images at a fixed rate or variable rate. In most always-on applications, images are captured in short time interval. Processing each image frame according to the method described in Section IV(A) would require either a fast processor that can classify each image frame before the next image frame is captured or a memory to store the captured images for a delayed processing, both consuming large amount of power.

On the other hand, because image frames are captured in short time interval in most always-on applications, sequentially captured image frames change little from their temporally adjacent image frames. As a result, features in the temporally adjacent image frames change little as well.

In various embodiments of the disclosure, features within a band of interest may be extracted from one image frame and compared with corresponding characteristic features of a target object within the band. If the corresponding characteristic features of the target object within the band do not exist in the image, the object is not detected. If the corresponding characteristic features of the target object within the band exist in the image, features within a next band of interest can be extracted from the next image and compared with corresponding characteristic features of the target object within the next band. In other words, each image frame is only processed and compared once, and can be discarded thereafter. Thus, each image frame may be processed and compared before the next frame is captured, even with a slower processor, and there is no need to store the image for a second processing or a delayed processing. Without the band-pass feature extraction capability, an image frame would be processed at least twice to extract features within a band, and therefore would require more data storage and more computation.

FIG. 12 is a flow chart illustrating an example process 1200 of a N-stage incremental object detection, such as human face detection, on multiple image frames, using a dual-threshold CS-LBP operator. In the first stage, at block 1210, an image frame is captured by an imager. The captured image frame is processed by a dual-threshold CS-LBP operator with $T_1=128$ and $T_2=256$ for band-pass gradient feature extraction at block 1220. At block 1230, the extracted gradient features in the gradient range of between 128 and 256 are compared with characteristic gradient features of a human face in the same gradient range by cascaded classifier 1 to determine whether the image frame could possibly include the human face. If it is determined that the image frame does not include the human face, process 1200 restarts at block 1210. If it is determined that the image frame may include the human face, a new image frame is captured at block 1240 for the second stage. The captured image frame is processed by the dual-threshold CS-LBP operator with a new threshold setting of $T_1=64$ and $T_2=128$ for band-pass gradient features extraction at block 1250. At block 1260, the extracted gradient features in the gradient range of between 64 and 128 are compared with characteristic gradient features of the human face in the same gradient range by cascaded classifier 2 to determine whether the image frame could possibly include the human face. The image frame may include the human face if a probability of matching to a human face is above a certain threshold value. If it is determined that the image frame does not include the human face, process 1200 restarts at block 1210. If it is determined that the image frame may include the human face, a new frame is captured at block 1270 for the third stage. The captured image frame is processed by the dual-threshold CS-LBP operator with a threshold setting of $T_1=32$ and $T_2=64$ for band-pass gradient features extraction at block 1280. The above data processing repeats for each of the N stages until block 1290 at the Nth stage. If, at any stage, the extracted gradient features from an image frame in a gradient band does not match the expected gradient features of the human face in the same gradient band, process 1200 restarts at block 1210. If, at each of the N stages, the extracted gradient features in a gradient band from an image frame match the expected gradient features of human face in the same gradient band, the human face is detected.

In some embodiments, an area of interest in the captured image frames may be tracked from frame to frame, such that similar area of the image frames is processed for each frame, even if the field of view of the imager changes or the target object moves.

Even though image capturing, feature extraction and classification for different stages are depicted in different blocks in FIG. 12, different stages can be implemented or accomplished on same hardware or firmware in a loop.

V. Multi-Bit Feature Extraction

In some embodiments, features in an image, such as texture or gradient magnitude, may be captured by quantizing the features with more than 1 bit. For example, a local multi-bit pattern (LMP) operator, which uses a divisive threshold rather than a subtractive threshold, can be used to extract features in multi-bit. The threshold function for an LMP operator can be described as follows:

$$f(g)=g/T \qquad (7)$$

In a preferred embodiment, threshold T may be a power of 2 such that a bit shift could perform the division.

As a result, in a center-symmetric local multi-bit pattern (CS-LMP), instead of 1 bit output for each center-symmetric pair, the bit-width of the output for each center-symmetric pair becomes $8-\log_2(T)$ for gradient g in the range of 0 to 256 (or $2^8$). Therefore, with a given smallest allowable threshold $T_{min}$ and N center-symmetric pixels in a cell, the total number of binary bits produced by a CS-LMP operator for the cell is $$\frac{N}{2}(8-\log_2(T_{min})),$$

and thus the maximum decimal number produced by the CS-LMP operator is $$2^{\frac{N}{2}(8-\log_2(T_{min}))}-1.$$

The generated CS-LMP labels may then be used in a similar way as the LBP or CS-LBP labels for object classification as described above.

VI. System Example

According to one or more aspects, any and/or all of the apparatus modules, circuitry, methods and/or method steps described in FIGS. 1-12 herein may be implemented by and/or in an electrical circuit or a computing device. Additionally or alternatively, any and/or all of the methods and/or method steps described herein may be implemented in computer-readable instructions, such as computer-readable instructions stored on a computer-readable medium, such as memory, storage or another computer-readable medium.

Figure 13:
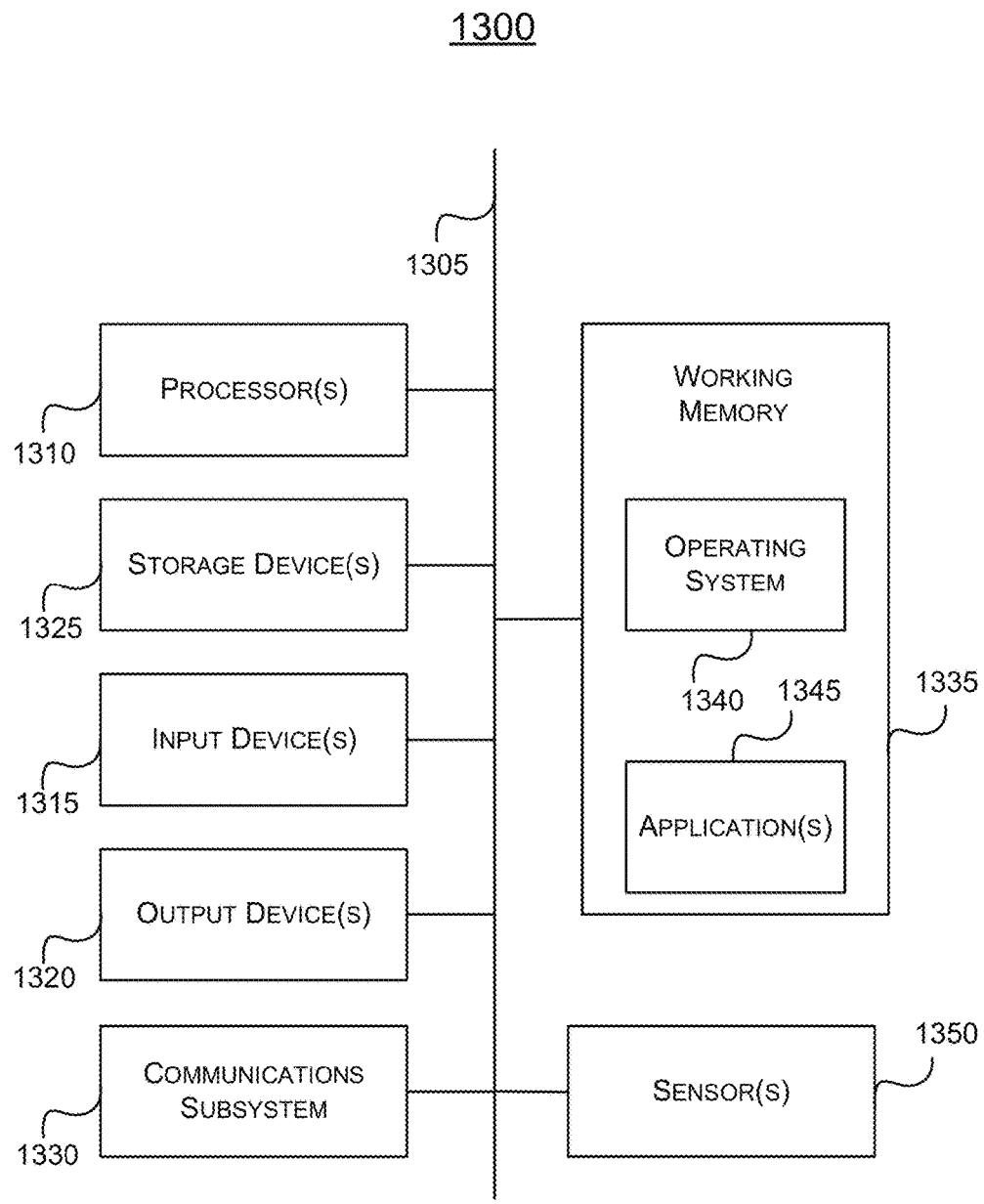
FIG. 13 illustrates an example of a computing system in which one or more embodiments may be implemented.

FIG. 13 illustrates an example computing device 1300 incorporating at least parts of the device or system employed in practicing embodiments of the disclosure. For example, computing device 1300 may represent some of the components of a mobile device or any other computing device. Examples of computing device 1300 include, but are not limited to, desktops, workstations, personal computers, supercomputers, video game consoles, tablets, smart phones, laptops, netbooks, or other portable devices. FIG. 13 provides a schematic illustration of one embodiment of computing device 1300 that may perform the methods provided by various other embodiments, as described herein, and/or may function as the host computing device, a remote kiosk/terminal, a point-of-sale device, a mobile multifunction device, a set-top box and/or a computing device. FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computing device 1300 is shown comprising hardware elements that may be electrically coupled via a bus 1305 (or may otherwise be in communication, as appropriate). The hardware elements may include one or more processors 1310, including, without limitation, one or more general-purpose processors and/or one or more special-purpose processors (such as digital signal processing chips, graphics acceleration processors, and/or the like); one or more input devices 1315, which may include, without limitation, one or more cameras sensors 1350, a touch screen, a mouse, a keyboard and/or the like; and one or more output devices 1320, which may include, without limitation, a display unit, a printer and/or the like. Sensors 1350 may include vision sensors, olfactory sensors and/or chemical sensors.

Computing device 1300 may further include (and/or be in communication with) one or more non-transitory storage devices 1325, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

Computing device 1300 may also include a communications subsystem 1330. Communications subsystem 1330 may include a transceiver for receiving and transmitting data or a wired and/or wireless medium. Communications subsystem 1330 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Communications subsystem 1330 may permit data to be exchanged with a network, other computing devices, and/or any other devices described herein. In many embodiments, computing device 1300 may further comprise a non-transitory working memory 1335, which may include a RAM or ROM device, as described above.

Computing device 1300 may comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as storage device(s) 1325 described above. In some cases, the storage medium might be incorporated within a computing device, such as computing device 1300. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by computing device 1300 and/or might take the form of source and/or installable code, which, upon compilation and/or installation on computing device 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1300 such as network input/output devices may be employed.

Some embodiments may employ a computing device (such as computing device 1300) to perform methods in accordance with the disclosure. For example, some or all of the procedures of the described methods may be performed by computing device 1300 in response to processor 1310 executing one or more sequences of one or more instructions (which might be incorporated into operating system 1340 and/or other code, such as an application program 1345) contained in working memory 1335. Such instructions may be read into working memory 1335 from another computer-readable medium, such as one or more of storage device(s) 1325. Merely by way of example, execution of the sequences of instructions contained in working memory 1335 might cause processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using computing device 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as storage device(s) 1325. Volatile media include, without limitation, dynamic memory, such as working memory 1335. Transmission media include, without limitation, coaxial cables, copper wire and fiber optics, including the wires comprise the bus 1305, as well as the various components of communications subsystem 1330 (and/or the media by which communications subsystem 1330 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1300. These signals, which might be in the form of electromagnetic signals, acoustic signals, optical signals and/or the like, are all examples of carrier waves on which instructions may be encoded, in accordance with various embodiments of the invention.

Communications subsystem 1330 (and/or components thereof) generally will receive the signals, and bus 1305 then might carry the signals (and/or the data, instructions, etc., carried by the signals) to working memory 1335, from which processor(s) 1310 retrieves and executes the instructions. The instructions received by working memory 1335 may optionally be stored on a non-transitory storage device 1325 either before or after execution by processor(s) 1310.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of object detection, comprising:
   receiving or capturing one or more images;
   performing object detection using the one or more images in a staged process, wherein each stage of the staged process includes:
   selecting a band of features from a plurality of bands of pre-determined features of a target object according to a pre-determined order of the plurality of bands, wherein the selected band of features is different for each stage;
   extracting corresponding features within the selected band from the one or more images by applying a dual-threshold local binary pattern operator to the one or more images, wherein the dual-threshold local binary pattern operator includes two thresholds, the two thresholds determined based on a range of gradient magnitudes in the selected band of features;
   determining whether a matching condition is met by comparing features in the selected band of features from the plurality of bands of the pre-determined features of the target object with the corresponding features within the selected band extracted from the one or more images; and
   exiting the staged process and generating a signal indicating that the target object is not detected when the matching condition is not met; and
   generating a signal indicating that the target object is detected if the matching condition is met at all stages of the staged process.

2. The method of claim 1, wherein all corresponding features are extracted from one image.

3. The method of claim 1, wherein the corresponding features extracted at each stage of the staged process are from a different image.

4. The method of claim 1, wherein the dual-threshold local binary pattern operator is a center-symmetric local binary pattern operator.

5. The method of claim 1, wherein a threshold function of the dual-threshold local binary pattern operator is configured to return a first binary value if a difference between pixel values of two pixels in an image is between a lower threshold and an upper threshold, or return a second binary value if otherwise.

6. The method of claim 5, wherein extracting the corresponding features within the band from the one or more images includes:
   setting the lower threshold and the upper threshold based on the selected band of features from the plurality of bands of the pre-determined features of the target object; and
   generating a local binary pattern label for a pixel in an image of the one or more images based on pixel values of neighboring pixels of the pixel in the image, the lower threshold, and the upper threshold.

7. The method of claim 1, wherein the plurality of bands of the pre-determined features of the target object are determined using at least one of support vector machine, K-nearest neighbor, or clustering.

8. The method of claim 1, wherein the plurality of bands of the pre-determined features of the target object are prioritized, and wherein selecting the band of features from the plurality of bands of the pre-determined features of the target object is based on the priorities of the plurality of bands of the pre-determined features of the target object.

9. The method of claim 1, further comprising:
   tracking a region of interest in the one or more images.

10. The method of claim 1, wherein the target object is at least one of a physical object, a human face, a human facial expression, or a human gesture.

11. An apparatus for object detection, comprising:
    means for receiving or capturing one or more images;
    means for performing object detection using the one or more images at a plurality of stages in a staged process, wherein each stage of the plurality of stages includes:
    means for selecting a band of features from a plurality of bands of pre-determined features of a target object according to a pre-determined order of the plurality of bands, wherein the selected band of features is different for each stage;
    means for extracting corresponding features within the selected band from the one or more images by applying a dual-threshold local binary pattern operator to the one or more images, wherein the dual-threshold local binary pattern operator includes two thresholds, the two thresholds determined based on a range of gradient magnitudes in the selected band of features;
    means for determining whether a matching condition is met by comparing features in the selected band of features from the plurality of bands of the pre-determined features of the target object with the corresponding features within the selected band extracted from the one or more images; and
    means for exiting the staged process and generating a signal indicating that the target object is not detected when the matching condition is not met; and means for generating a signal indicating that the target object is detected if the matching condition is met at all stages of the plurality of stages.

12. The apparatus of claim 11, wherein all corresponding features are extracted from one image.

13. The apparatus of claim 11, wherein the corresponding features extracted at each stage of the plurality of stages are from a different image.

14. The apparatus of claim 11, wherein the dual-threshold local binary pattern operator is a center-symmetric local binary pattern operator.

15. The apparatus of claim 11, wherein a threshold function of the dual-threshold local binary pattern operator is configured to return a first binary value if a difference between pixel values of two pixels in an image is between a lower threshold and an upper threshold, or return a second binary value if otherwise.

16. The apparatus of claim 15, wherein extracting the corresponding features within the band from the one or more images includes:
setting the lower threshold and the upper threshold based on the selected band of features from the plurality of bands of the pre-determined features of the target object; and
generating a local binary pattern label for a pixel in an image of the one or more images based on pixel values of neighboring pixels of the pixel in the image, the lower threshold, and the upper threshold.

17. The apparatus of claim 11, wherein the plurality of bands of the pre-determined features of the target object are prioritized, and wherein selecting the band of features from the plurality of bands of the pre-determined features of the target object is based on the priorities of the plurality of bands of the pre-determined features of the target object.

18. A system for object detection, comprising:
an imager configured to capture or receive one or more images; and
a circuit configured to perform object detection using the one or more images in a staged process, wherein each stage of the staged process includes:
selecting a band of features from a plurality of bands of pre-determined features of a target object according to a pre-determined order of the plurality of bands, wherein the selected band of features is different for each stage;
extracting corresponding features within the selected band from the one or more images by applying a dual-threshold local binary pattern operator to the one or more images, wherein the dual-threshold local binary pattern operator includes two thresholds, the two thresholds determined based on a range of gradient magnitudes in the selected band of features;
determining, by a classifier, whether a matching condition is met by comparing features in the selected band of features from the plurality of bands of the pre-determined features of the target object with the corresponding features within the selected band extracted from the one or more images; and
exiting the staged process and generating a signal indicating that the target object is not detected when the matching condition is not met;
wherein the circuit is further configured to generate a signal indicating that the target object is detected if the matching condition is met at all stages of the staged process.

19. The system of claim 18, wherein all corresponding features are extracted from one image.

20. The system of claim 18, wherein the corresponding features extracted at each stage of the staged process are from a different image.

21. The system of claim 18, wherein the dual-threshold local binary pattern operator is a center-symmetric local binary pattern operator.

22. The system of claim 18, wherein a threshold function of the dual-threshold local binary pattern operator is configured to return a first binary value if a difference between pixel values of two pixels in an image is between a lower threshold and an upper threshold, or return a second binary value if otherwise.

23. The system of claim 22, wherein extracting the corresponding features within the band from the one or more images includes:
setting the lower threshold and the upper threshold based on the selected band of features from the plurality of bands of the pre-determined features of the target object; and
generating a local binary pattern label for a pixel in an image of the one or more images based on pixel values of neighboring pixels of the pixel in the image, the lower threshold, and the upper threshold.

24. The system of claim 18, wherein the plurality of bands of the pre-determined features of the target object are prioritized, and wherein selecting the band of features from the plurality of bands of the pre-determined features of the target object is based on the priorities of the plurality of bands of the pre-determined features of the target object.

25. An article comprising a non-transitory storage medium including machine-readable instructions stored thereon that are executable by a special purpose computing device to:
receive or capture one or more images;
perform object detection using the one or more images in a staged process, wherein each stage of the staged process includes:
selecting a band of features from a plurality of bands of pre-determined features of a target object according to a pre-determined order of the plurality of bands, wherein the selected band of features is different for each stage;
extracting corresponding features within the selected band from the one or more images by applying a dual-threshold local binary pattern operator to the one or more images, wherein the dual-threshold local binary pattern operator includes two thresholds, the two thresholds determined based on a range of gradient magnitudes in the selected band of features;
determining whether a matching condition is met by comparing features in the selected band of features from the plurality of bands of the pre-determined features of the target object with the corresponding features within the selected band extracted from the one or more images; and
exiting the staged process and generating a signal indicating that the target object is not detected when the matching condition is not met; and
generate a signal indicating that the target object is detected if the matching condition is met at all stages of the staged process.

26. The article of claim 25, wherein the corresponding features extracted at each stage of the staged process are from a different image.

27. The article of claim 25, wherein the dual-threshold local binary pattern operator is a center-symmetric local binary pattern operator.

28. The article of claim 25, wherein a threshold function of the dual-threshold local binary pattern operator is configured to return a first binary value if a difference between pixel values of two pixels in an image is between a lower threshold and an upper threshold, or return a second binary value if otherwise.

29. The article of claim 28, wherein extracting the corresponding features within the band from the one or more images includes:
- setting the lower threshold and the upper threshold based on the selected band of features from the plurality of bands of the pre-determined features of the target object; and
- generating a local binary pattern label for a pixel in an image of the one or more images based on pixel values of neighboring pixels of the pixel in the image, the lower threshold, and the upper threshold.

30. The article of claim 25, wherein the plurality of bands of the pre-determined features of the target object are prioritized, and wherein selecting the band of features from the plurality of bands of the pre-determined features of the target object is based on the priorities of the plurality of bands of the pre-determined features of the target object.

* * * * *